(12) United States Patent
Roy

(10) Patent No.: US 7,278,613 B2
(45) Date of Patent: Oct. 9, 2007

(54) PIPELINE SKID AND A SKID SYSTEM FOR USE IN PIPELINE CONSTRUCTION

(76) Inventor: David E. Roy, 9413 W. University #5627, Odessa, PA (US) 79764-8915

( * ) Notice: Subject to any disclaimer, the term of this patent is extended or adjusted under 35 U.S.C. 154(b) by 22 days.

(21) Appl. No.: 10/950,720

(22) Filed: Dec. 20, 2004

(65) Prior Publication Data

US 2006/0131469 A1    Jun. 22, 2006

(51) Int. Cl.
  *F16L 3/00*   (2006.01)
  *A47B 91/00*  (2006.01)
  *B65D 19/00*  (2006.01)

(52) U.S. Cl. ............... 248/49; 248/55; 248/65; 248/346.01; 138/106

(58) Field of Classification Search .......... 248/49, 248/55, 65, 346.01, 346.03, 346.5, 154; 138/106
See application file for complete search history.

(56) References Cited

U.S. PATENT DOCUMENTS

| | | | | |
|---|---|---|---|---|
| 1,703,605 A | * | 2/1929 | Ballantyne | 138/106 |
| 1,846,550 A | * | 2/1932 | Gottwald | 138/106 |
| 1,858,101 A | * | 5/1932 | McAfee | 248/49 |
| 2,846,168 A | * | 8/1958 | Schroeter | 248/49 |
| 2,849,027 A | * | 8/1958 | Tetyak | 138/112 |
| 3,026,076 A | * | 3/1962 | Bender | 248/49 |
| 3,471,987 A | * | 10/1969 | Yelsma | 52/684 |
| 3,980,262 A | | 9/1976 | Lee | |
| 3,993,192 A | * | 11/1976 | Bunn | 206/515 |
| 4,004,766 A | * | 1/1977 | Long | 248/55 |
| 4,040,447 A | | 8/1977 | Scott | |
| 4,502,653 A | * | 3/1985 | Curtis, Jr. | 248/55 |
| 4,513,934 A | * | 4/1985 | Pruyne | 248/49 |
| D279,164 S | * | 6/1985 | Mitchell et al. | D8/354 |
| 4,534,535 A | * | 8/1985 | Maeda et al. | 248/636 |
| 4,787,583 A | | 11/1988 | Morton | |
| 4,899,963 A | * | 2/1990 | Murphy | 248/65 |
| 5,072,901 A | * | 12/1991 | Scott | 248/49 |
| 5,729,949 A | * | 3/1998 | Hartzheim | 52/677 |
| D408,726 S | * | 4/1999 | Vallee | D8/380 |
| 5,954,302 A | * | 9/1999 | Robertson et al. | 248/74.3 |
| D436,522 S | * | 1/2001 | Neider et al. | D8/380 |
| 6,170,789 B1 | * | 1/2001 | Hayakawa | 248/346.01 |
| 6,520,456 B1 | * | 2/2003 | Neider et al. | 248/49 |
| D500,243 S | * | 12/2004 | Turek | D8/354 |
| D500,668 S | * | 1/2005 | Kelly et al. | D8/354 |
| D521,851 S | * | 5/2006 | Smart | D8/354 |

* cited by examiner

*Primary Examiner*—Carl D. Friedman
*Assistant Examiner*—Michael McDuffie
(74) *Attorney, Agent, or Firm*—Harold I. Masteller, Jr.

(57) ABSTRACT

The present invention comprises a skid that includes at least one stackable pedestal having a continuous wall, the continuous wall enclosing an opening that extends from a first pedestal end to a second pedestal end. The stackable pedestal includes at least two support blocks, each support block having a top surface height that places a stacked pedestal at a raised position over a previously placed pedestal to prevent surface-to-surface contact between the adjacent stacked pedestal walls. A yoke is demountably coupled to the second pedestal end of a single pedestal, or to the second pedestal end of a last stacked pedestal in the skid, and the yoke includes a cradle shaped to support a pipe.

44 Claims, 8 Drawing Sheets

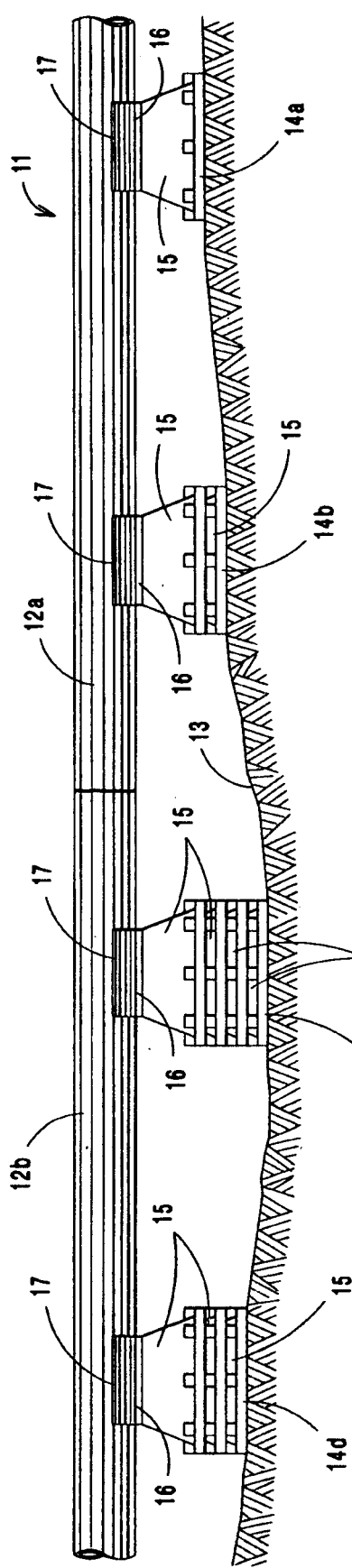
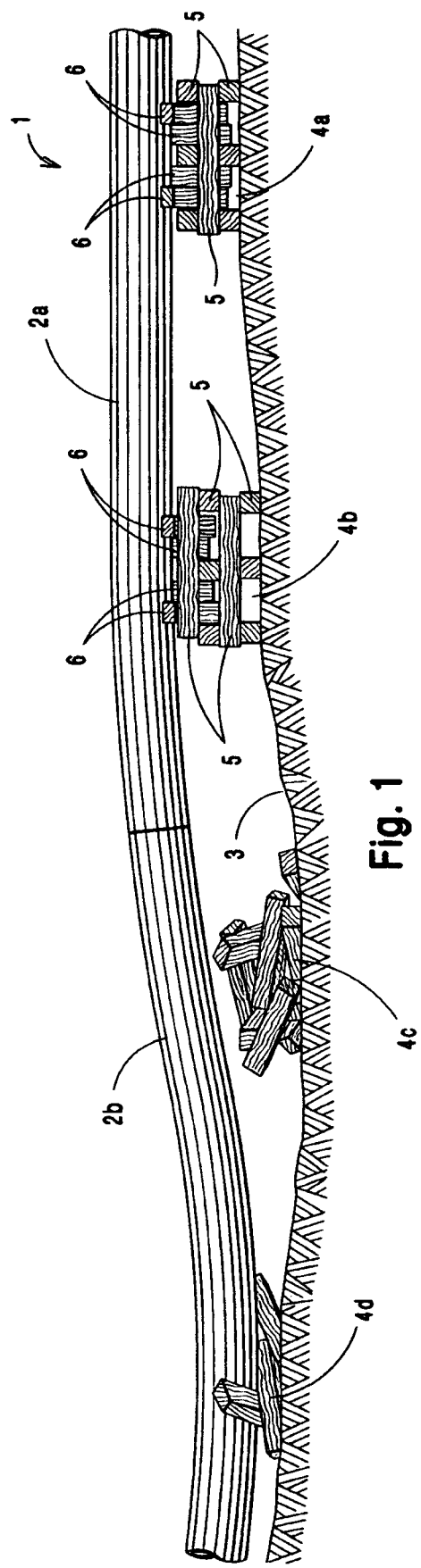
Fig. 2
Fig. 1
Prior Art

PIPELINE SKID AND A SKID SYSTEM FOR USE IN PIPELINE CONSTRUCTION

FIELD OF THE INVENTION

This invention is directed to an improved skid for shoring up long sections of pipe joints along a pipeline construction site, and in particular, it is directed to a skid system comprising a plurality pedestals that can be stacked or un-stacked to support the pipe joints at a predetermined work height above ground level elevation; each pedestal adapted to demountably couple to a yoke having a cradle shaped to support a particular range of pipe diameters.

BACKGROUND ART

In state-of-the-art pipeline construction, individual lengths of pipes called "joints" are welded together into a continuous length of pipe called a "section." Pipe joints are taken from a stockpile and loaded onto specialized trucks that haul the joints to a construction site where the joints are off loaded with a side-boom tractor that strings the joints end-to-end along the pipeline right-of-way. Joints measuring up to 80-feet (24.4 meters) long and between about 2 inches (5.08 cm) up to about 72 inches (182.9 cm) in diameter are used in such pipeline construction applications. The joints are usually, but not always, surface coated with a corrosion resistant material for long-term protection.

Prior to offloading the pipe joints, 4"×6" by 4'-0" long wood timbers, called skids, are delivered to the jobsite on steel frame structures known as skid baskets. Each skid basket holds approximately 300 wood skids and a tractor-trailer can hold two skid baskets. Alternatively, skids are pallet stacked on a tractor-trailer for delivery and forklift unloading at the job site. A 40-foot tandem-axle tractor-trailer float can carry between 2,000 to 2,500 skids to the jobsite, and a single tractor-trailer float delivery does not normally provide enough skids to complete a one-mile long section. Simultaneous with the laying of the joints, the skids are stacked in alternating layers at spaced apart locations along the pipeline right-of-way to provide a continuous line of skid structures that position the joints at a predetermined work height adjacent a trench. After teams of workers weld the joints together, the assembled section is removed from the skids and buried in the trench. The welded pipeline section is generally lowered into the trench with side-boom tractors. The trench is backfilled and clean-up crews carefully replace the soils. The cleanup crews reload the skids into the skid baskets or onto the tractor-trailer for delivery either to a new location down the line or to a storage area. Such assembly and disassembly of wood skids is labor intensive and costly.

Wood skids are problematic because they are bulky and heavy, making them both awkward to use, and difficult to move to and from construction sites. Their excessive weight causes a variety of lifting and dropping injuries that include strained muscles to broken bones and their tendency to splinter causes a variety of puncture wounds. Additionally, stacked wood is unsatisfactory for use as a pipeline support structure because wood has a high Relative Coefficient of Sliding Friction (RCSF). The high RCSF between the wood skid support structure and coated joints causes the skid support structures to have a propensity for collapsing in response to unexpected movement along lengths of supported sections. For example, it is not uncommon for a worker to bump a section with a vehicle or other piece of equipment during the construction phase. Such impacts, even when minor, tend to generate a lateral force along the partially completed section, and the high RCSF between the wood skid support structure and pipe surface causes supported sections to collapse. Such a section collapse results in extensive damage to the pipe and to its protective corrosion coating. A section collapse is also a major cause of injuries and fatalities at a pipeline construction site. Proper repair of damaged joints along a collapsed section requires numerous man-hours of intensive labor to reassemble collapsed wood skids, elevate the fallen section, and repair any damaged to the joints and/or the corrosion coating.

Another problem associated with wood skids, as well as with other high friction materials used for pipeline support structures, is related to ambient temperature changes at the construction site. Fluctuating temperatures alternately heat and cool the supported section. This causes expansion and contraction along the section and generates a lateral force against the skid support structures. Such lateral forces can cause the skid support structures to collapse when the pipe section is not able to slide freely along the contacting surfaces.

SUMMARY OF THE INVENTION

Accordingly, it is a first object of the present invention to provide a lightweight skid that can be stacked or un-stacked to support a joint at a predetermined work height.

It is another object of the present invention to provide a lightweight skid capable of supporting a range of different pipe diameters.

Another object of the present invention is to provide a lightweight skid that is easy to deliver and remove from a construction site.

A still further object of the present invention is to provide a lightweight skid that reduces the possibility of a collapse in response to a lateral force applied along a supported section.

Other objects and advantages of the present invention will become apparent as a description thereof proceeds.

In satisfaction of the foregoing objects and advantages, the present invention provides a skid comprising at least one stackable pedestal defined by a continuous wall enclosing an opening that extends from the first end to the second end of the stackable pedestal. The stackable pedestal includes at least two support blocks, each support block having a top surface height positioned to receive a stacked pedestal at a raised location over the continuous wall of a previously placed pedestal. The raised position prevents surface-to-surface contact between the adjacent continuous walls of stacked pedestals. A yoke is demountably coupled to the second end of the stackable pedestal, and the yoke includes a cradle shaped to support a pipe.

BRIEF DESCRIPTION OF THE DRAWINGS

FIG. 1, labeled Prior Art, is an elevation view showing a section supported on wood skids.

FIG. 2 is an elevation view showing a section supported on the skids of the present invention.

DESCRIPTION OF THE PREFERRED EMBODIMENTS OF THE INVENTION

Figure 3:
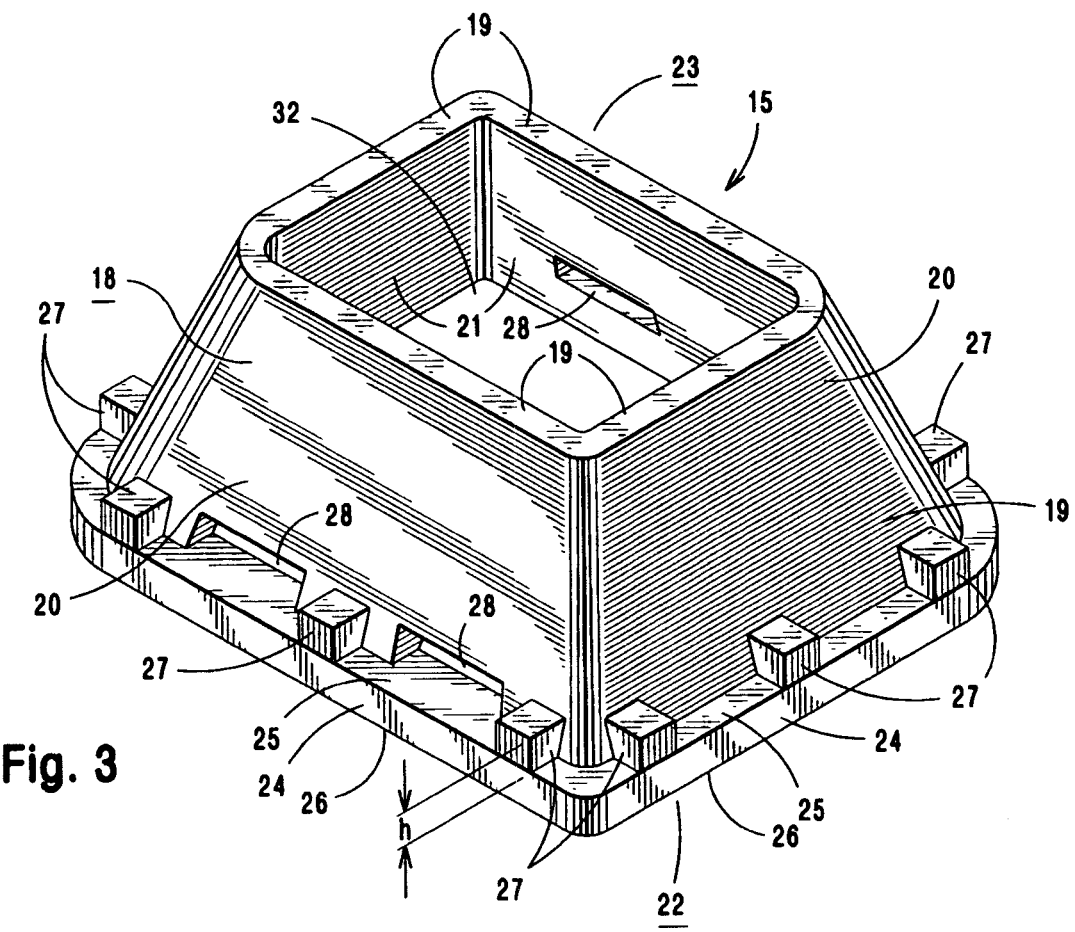
FIG. 3 is an isometric view showing a stackable pedestal of the present skid invention.

Referring to FIG. 1 of the drawings, labeled "Prior Art," exemplary joints 2a and 2b are welded together in a portion of a section 1. Prior to the collapsed position shown in FIG. 2, joints 2a-2b of section 1 were supported above the ground 3 on skid structures 4a through 4d. Skid structures 4a-4d comprise alternating perpendicular layers of wood timbers 5, as shown at skid structures 4a and 4b, to support joints 2a and 2b at a desired work height above the ground level. At least two wood timbers 6 are inserted diagonally into such alternating layers of wood timbers 5 to prevent joints 2a, 2b, and/or section 1 from rolling off the skid structures during construction operations. The number of alternating wood timber layers 5 is increased or decreased from skid to skid to compensate for any changes in ground level elevation between skid structures. For example, skid 4a comprises three alternating wood timber layers 5, and skid 4b comprises four alternating wood timber layers 5 to provide a continuous joint work height along changing ground level elevations.

As heretofore mentioned above, wood skid structures are problematic because the timbers are bulky and heavy, making them awkward to use and difficult to move to and from construction sites. Additionally, wood timbers are an unsatisfactory skid material because of the high RCSF between the wood surfaces and the corrosion coating applied to the joints. The high RCSF causes wood skid structures to have a propensity for collapsing in response to unexpected movement along the skid supported pipe sections as shown at collapsed skid structures 4c and 4d. For example, when a section is accidentally bumped by a vehicle or the like, the impact, even when minor, generates a lateral force along section 1. The high RCSF between the wood skid structures and the coated joint surfaces can cause long lengths of supported section 1 to collapse. Another problem related to the use of wood skid structures, as well as other skid structures manufactured with high friction materials, is related to changes in ambient temperature at the construction site. Fluctuating temperatures cause expansion and contraction along supported section 1, and the resulting changes in section length generates a lateral force against the skid structures. This lateral force may cause the skid structures to collapse, as shown at skid structures 4c and 4d, if the supported section is not able to freely slide or move along the wood skid structures.

Referring to FIG. 2, showing the preferred embodiment of the present invention, skids 14a through 14d are shown supporting exemplary joints 12a and 12b in a portion of a section 11. Skids 14a-14d comprise at least one stackable pedestal 15 that is demountably coupled to a yoke 16. The skids are spaced apart along a pipeline right-of-way at locations that will safely support and hold joints at a desired work height above the ground 13, and the joints are welded together to form a continuous section 11. Either a single pedestal, or two or more stacked pedestals 15, demountably coupled to a single yoke 16, are provided at each skid location 14a-14d to adjust for any changes in ground level elevation along the pipeline right-of-way. For example, in response to the change in ground level elevation between skids 14a through 14d, different numbers of pedestals 15 are stacked together at each skid location to provide a skid that supports the joints and/or section at the desired work height. Specifically, skid 14b comprises two stacked pedestals 15 demountably coupled to a yoke 16, skid 14c comprises four stacked pedestals 15 demountably coupled to a yoke 16, and skid 14d comprises three stacked pedestals 15 demountably coupled to a yoke 16.

In the preferred embodiment, the entire yoke 16, or only the pipe-contacting cradle 17 of each yoke 16, is manufactured with an ultra high molecular weight polymer material that provides a low RCSF between cradle 17 and the coated pipe surface. One such material available in the current market is an ultra high molecular weight range polymer (UHMWR) named GAR-DUR®. GAR-DUR has an abrasion index resistance of 10, and a RCSF to steel of about 0.14. Other exemplary low friction materials that may be considered for yoke or cradle materials are nylon and acetal, both having a RCSF to steel of about 0.20, and Teflon®, having a RCSF to steel of about 0.11. However, these other low friction materials have an abrasion index resistance greater than 10. For example, nylon has an abrasion index resistance of 24, and accordingly, it can be expected that such materials will have a shorter service life as compared to an ultra high molecular weight material. The use of such low friction material facilitates lateral movement between the supported section and skids so that the collapsing problem associated with the wood skids 4c and 4d (FIG. 1) is eliminated.

Referring to FIGS. 3-6, showing enlarged views of the preferred skid embodiment of the present invention, and in particular, referring to FIG. 3, pedestal 15 comprises a tubular shape defined by a continuous wall 19. In the preferred embodiment, pedestal 15 is the frustum of a pyramid 18 having a rectangular ground plane end 22 opposite a rectangular cutoff end 23. Continuous wall 19 includes an outside surface 20 and an inside surface 21, the inside surface defining an opening 32 that extends from the ground plane end 22 to the cutoff end 23 of the tubular pedestal 15.

Ground plane end 22 includes a base pad 24 that extends in an outward direction along the periphery of wall 19, and base pad 24 includes a top surface 25 and a bottom surface 26. A plurality of support blocks 27, having a top surface height "h," are attached to and spaced apart at locations along the top surface 25 of base pad 24. The top surface height of the support blocks is predetermined to enable stacking multiple pedestals as explained in greater detail below. Lifting apertures 28 extend through opposite sides of the continuous wall 19 to provide means for picking up and transporting either a single pedestal or stacked pedestals 15 with a forklift or like device.

It should be understood however, that while the preferred embodiment shows pedestal 15 comprising a frustum of a pyramid with a rectangular ground plane end 22 opposite a rectangular cutoff end 23, any suitable pedestal shape considered obvious to one skilled in the art may be used without departing from the scope of the present invention. For example, the ground plane end and cutoff end could be either a square or a polygon shape. Similarly, the ground plane end and cutoff end may comprise different shapes, for instance, the ground plane end could be a rectangle shape while the cutoff end is a round shape. Likewise, pedestal 15 could be a frustum of a cone having a circle shaped ground plane end and a round cutoff end. Additionally, pedestal 15 could include a closed cutoff end 23 with a pocket or socket formed therein and shaped to demountably couple with yoke 16. Lastly, support blocks 27 could be attached to the outside surface of continuous wall 19 without providing a base pad 24 along the rectangular ground plane end 22.

Figure 4:
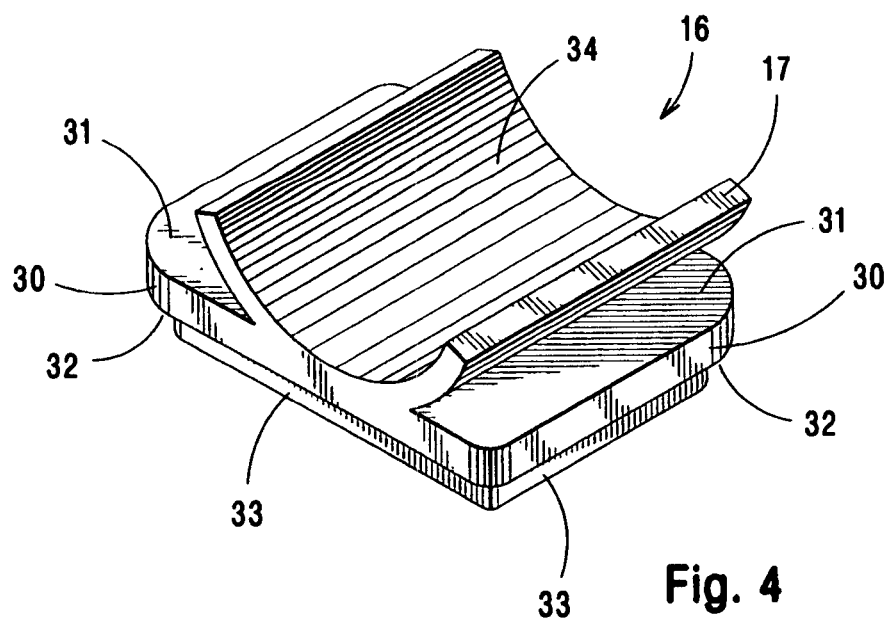
FIG. 4 is an isometric view showing a yoke of the present skid invention.
Figure 5:
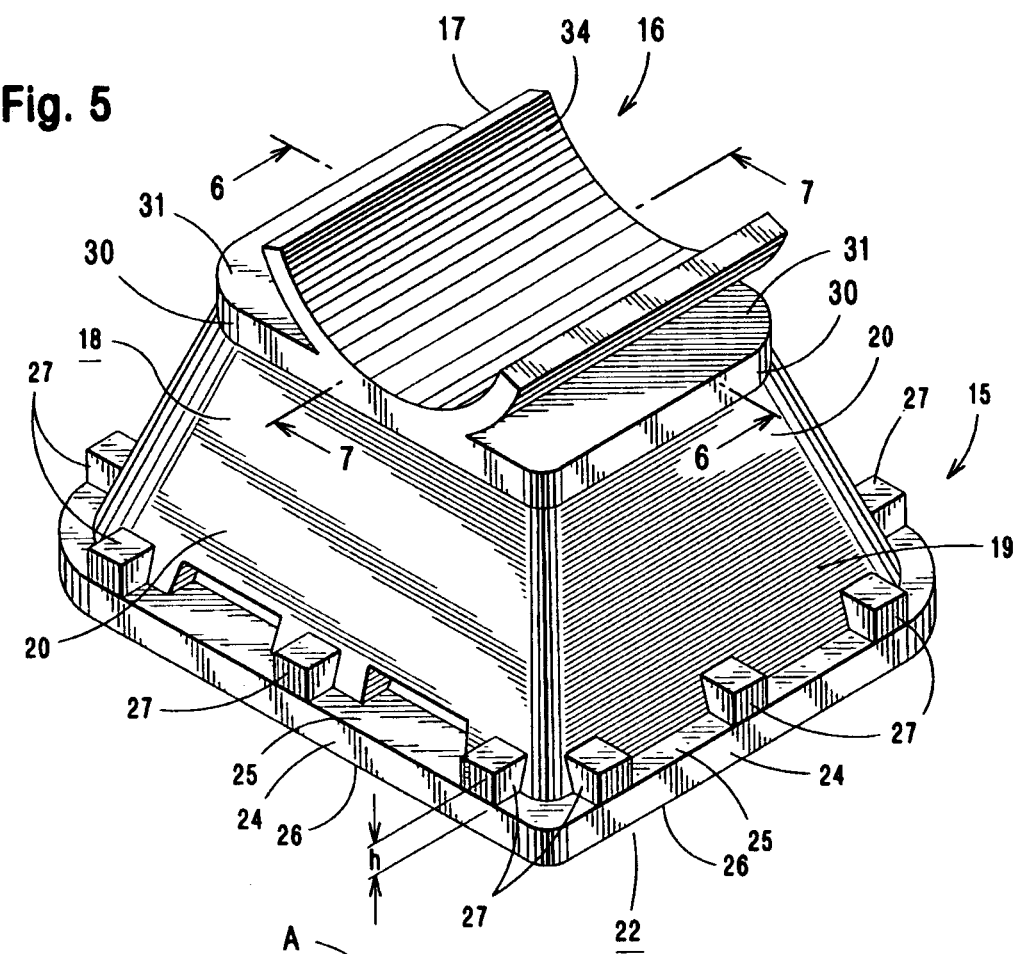
FIG. 5 is an isometric view showing the yoke of FIG. 4 demountably coupled to the pedestal of FIG. 3.
Figure 6:
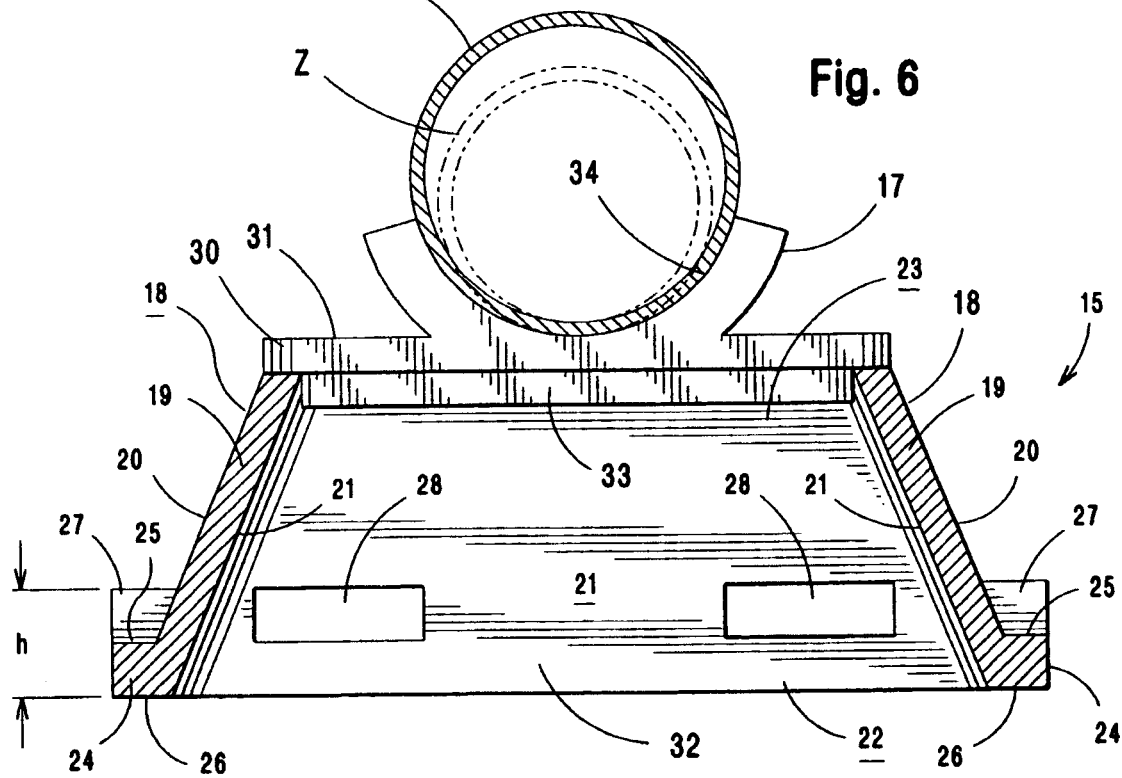
FIG. 6 is a cross-section taken along the lines 6-6 of FIG. 5.

Yoke 16, shown in FIGS. 4-6, comprises a platform 30 that corresponds to the shape of continuous wall 19 at the cutoff end 23, as shown in FIG. 3. A coupling foot 33 extends in a downward direction from the platform 30, and the coupling foot is shaped to fit within the opening 32 provided at cutoff end 23. A cradle 17 is attached to platform 30 and cradle 17 extends above the top surface 31 of the platform. Cradle 17 includes a curved surface 34 that corresponds with the largest pipe diameter "A" in a range of pipe diameters "A" through "Z" shown in FIG. 6. Accordingly, pipe "A," the largest pipe in the range "A-Z," is held more securely within cradle 17 as compared to the smaller pipes in the range, for example, pipe diameter "Z."

Figure 8A:
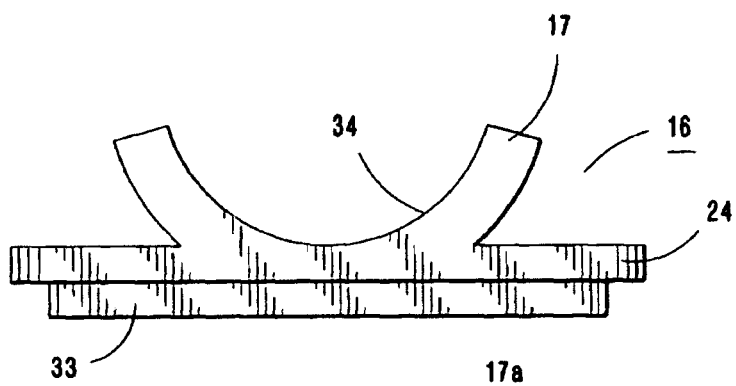
FIGS. 8A-8C show different yokes adapted support respective ranges of different pipe diameters.
Figure 8B:
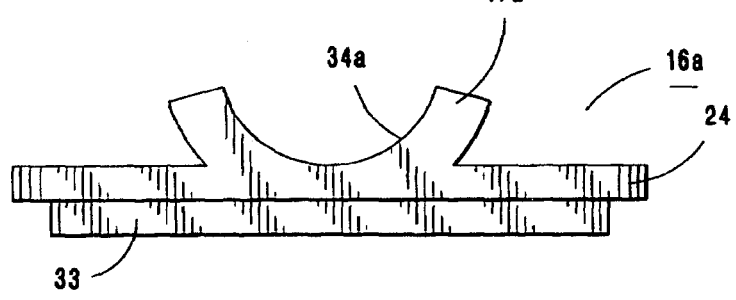
Figure 8C:
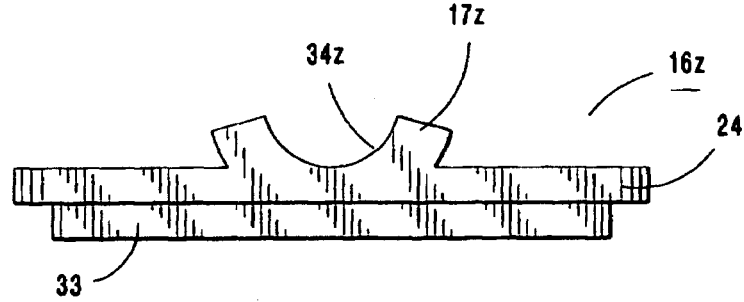

Referring to FIGS. 8a-8c of the drawings, a series of yokes 16, through 16z having different cradle sizes 17, through 17z. Referring in particular to FIG. 8a, the first yoke 16 includes the largest cradle size 17. Cradle 17 has a curved surface 34 shaped to support a first range of pipe diameters "A-Z." The first range of pipe diameters includes the largest pipe diameter supported by the skids of the present invention, for instance, a 72" (182.9 cm) diameter pipe. FIG. 8c shows the last yoke in the series 16z having the smallest cradle size 17z. Cradle 17z has a curved surface 34z shaped to support a last range of pipe diameters "A-Z." The last range of pipe diameters includes the smallest pipe diameter supported by the skids of the present invention, for instance a 2" diameter pipe. FIG. 8b shows at least one intermediate yoke in the series 16a having an intermediate cradle size 17a. Cradle 17a has a curved surface 34a shaped to support an intermediate range of pipe diameters "A-Z." The intermediate range of pipe diameters falls between the pipe diameters supported by the first and last yokes 1 and 16z respectively. Each yoke 16-16z includes a platform 30 and coupling foot 33.

Figure 7:
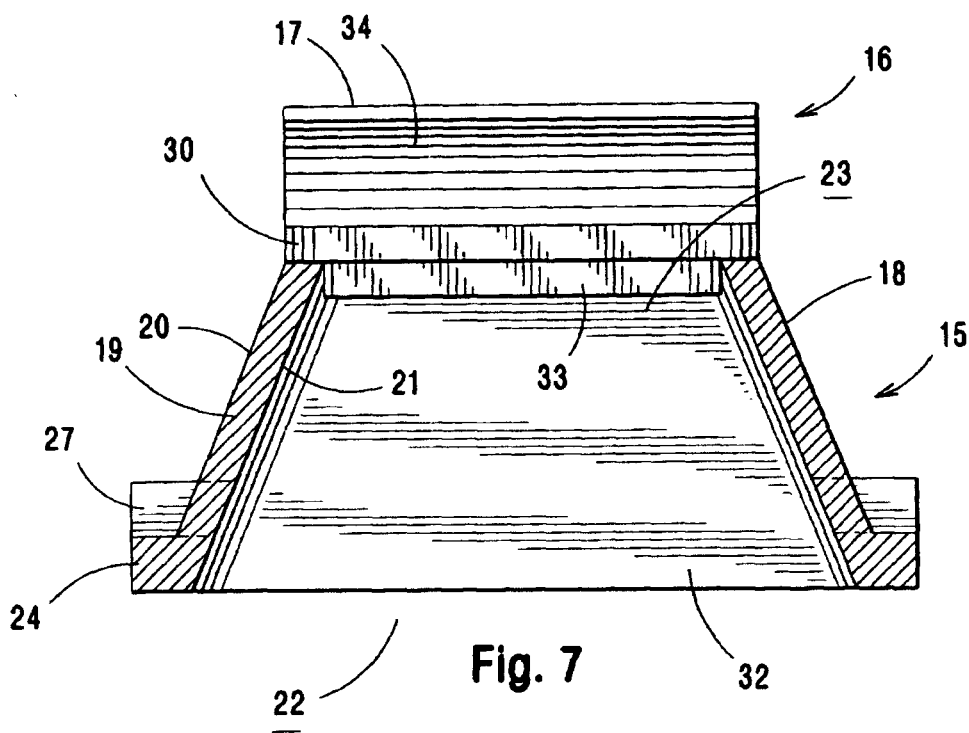
FIG. 7 is a cross-section taken along the lines 7-7 of FIG. 5.

Referring to FIGS. 6, and 7, yoke, 16, is shown demountably coupled to pedestal 15 by inserting the coupling foot 33 into the opening 32 at cutoff end 23. In FIG. 6, the largest pipe diameter "A" and the smallest pipe diameter "Z" in the first range of different pipe diameters "A-Z," are shown supported in cradle 17. As clearly shown in the drawing, pipe diameter "A" contacts the entire, or almost the entire, arc of the curved surface 34. However, the smaller pipe diameter "Z" contacts only a portion of the arc defining curved surface 34 of the cradle, and as such, the smaller diameter pipe is not held as securely within cradle 17 as compared to pipe diameter "A."

Figure 9:
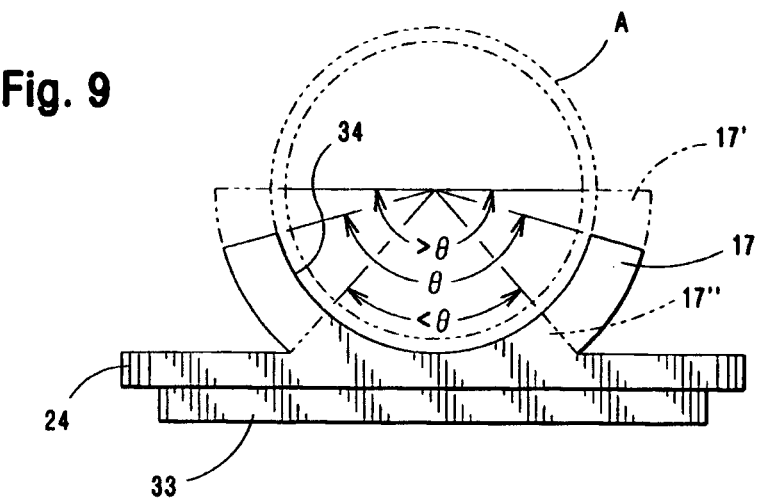
FIG. 9 is a front elevation view showing the yoke of the present invention.

Referring to FIG. 9, a preferred angle Θ for the arc defining curved surface 34 is about 150°. However, angle Θ may be changed without departing from the scope of the present invention. For example, as shown in FIG. 9, the angle of the arc defining curved surface 34 for cradle 17' is >Θ, about 180°, while the angle of the arc defining curved surface 34 for cradle 17" is <Θ, about 80°. Accordingly, the range of the angle defining curved surface 34 is between about 80° to about 1800.

Figure 10:
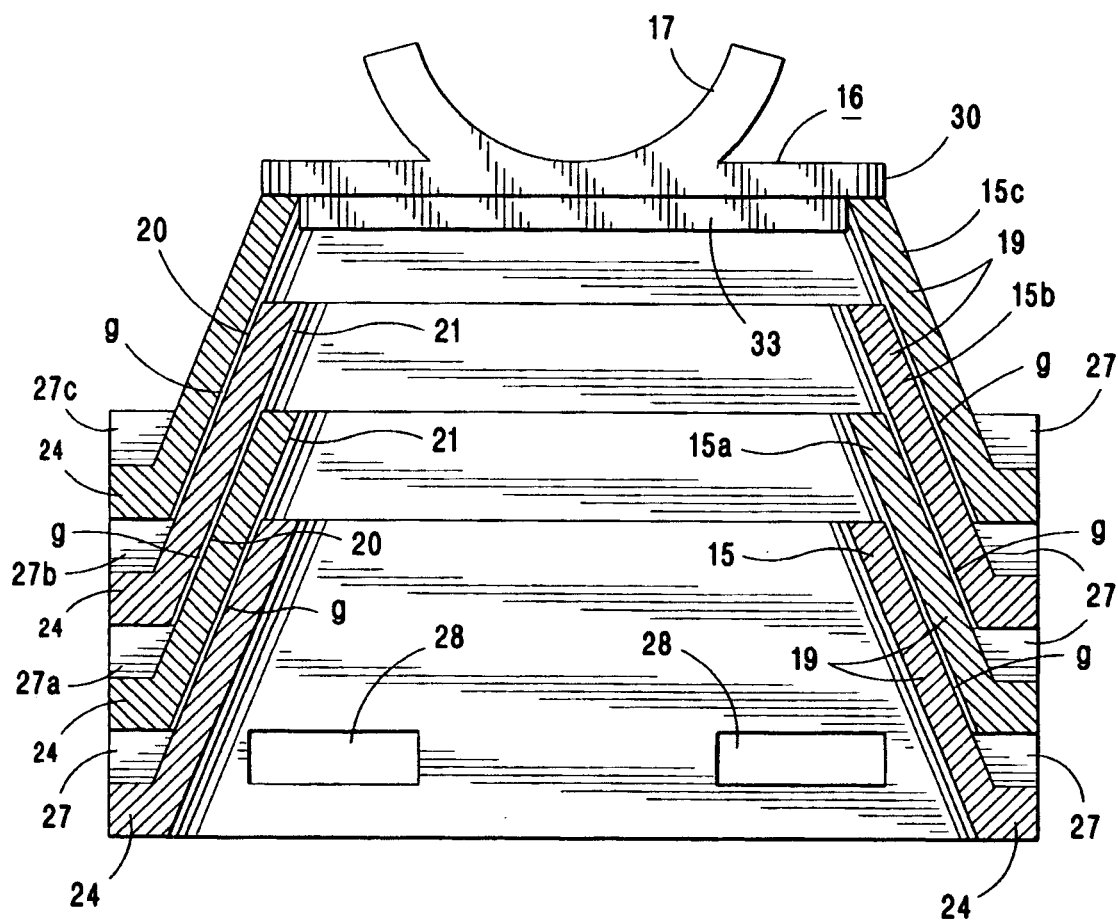
FIG. 10 is a cross-section showing stacked pedestals and a yoke.

Referring to FIG. 10, in instances where more than a single pedestal 15 is required to maintain the joints at the desired work height, for example skids 14a-14d of FIG. 2, two or more stacked pedestals 15 may be used to provide a suitable skid height. In FIG. 10, a skid arrangement, similar to skid 14c in FIG. 2, is shown comprising four stacked pedestals 15-15c, with the top or last stacked pedestal 15c being demountably coupled to a selected yoke. In this instance, the selected yoke is yoke 16 so that FIG. 10 corresponds with the exemplary skids in FIG. 2.

The top surface of the support blocks 27-27c, defined as height "h" in FIG. 3, positions each stacked pedestal 15a, 15b or 15c at a raised location above its respective previously placed pedestal 15, 15a or 15b. This raised pedestal position prevents surface-to-surface contact between adjacent continuous walls 19 of the stacked pedestals by providing a space or gap "g" between adjacent outside and inside wall surfaces 20 and 21. Gap "g" eliminates the problems often associated with stacking plastic articles together in that the contacting walls of such stacked articles tend to create a partial vacuum that causes the stacked articles to stick together. This makes it very difficult to separate the stack. Gap "g" eliminates the problem, making it easier to separate the stack pedestals.

Referring again to FIG. 10, apertures 28 extend through opposite locations along continuous wall 19, and the apertures are positioned at a location below the top surface height "h" of the pedestal support blocks 27. The location of apertures 28 of provides clearance below the base pad 24 of a stacked pedestal when lifting tines are inserted through apertures 28 to pick up and move stacked pedestals.

In the preferred embodiment of the present invention, shown in FIGS. 2, 5, and 9, height "h" is 3-inches. Accordingly, in the exemplary skid arrangement shown in FIG. 2, skid 14b has two stacked pedestals 15 to adjust the overall skid height for a 3-inch change in ground level elevation between skid 14a, and skid 14b. Similarly, skid 14c includes four stacked pedestals 15 to compensate for a 9-inch change in ground level elevation between skid 14a and skid 14c. Finally, skid 14d, having three stacked pedestals 15, compensates for a 6-inch change in ground level elevation between skids 14a and 14d. It should be understood however, that the 3-inch height is only an example and that height "h" may be changed to any suitable dimension without departing from the scope of the present invention.

Figure 11:
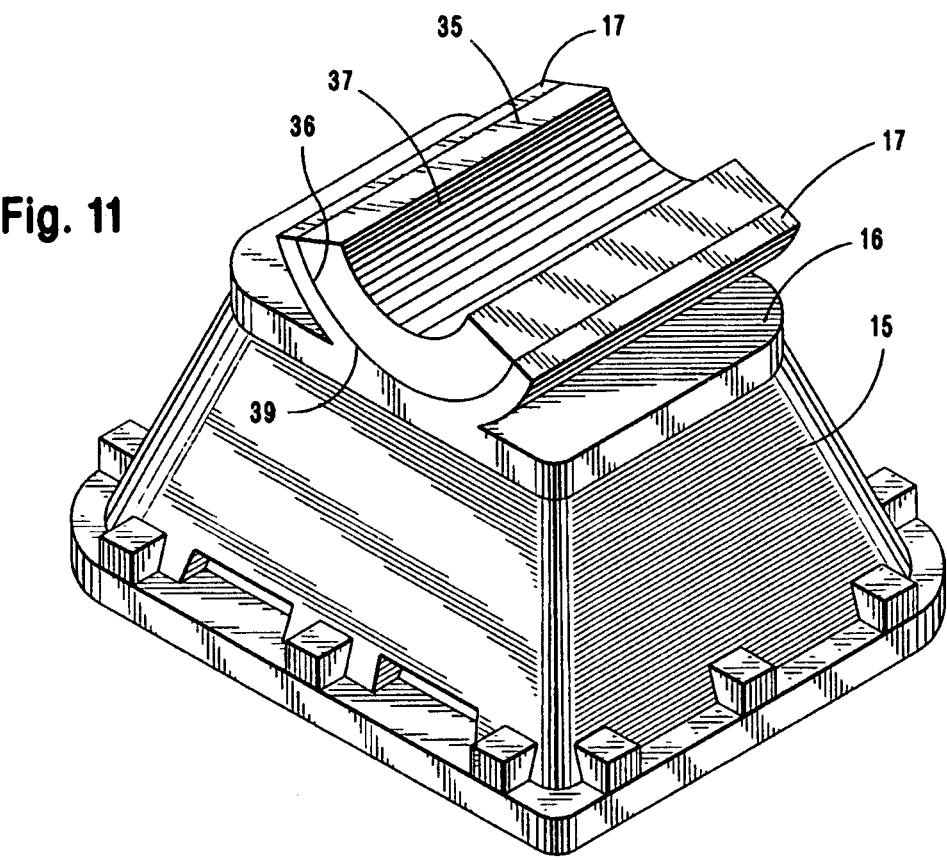
FIG. 11 is an isometric view showing a cradle insert removably fixed in a yoke coupled to a pedestal.
Figure 11A:
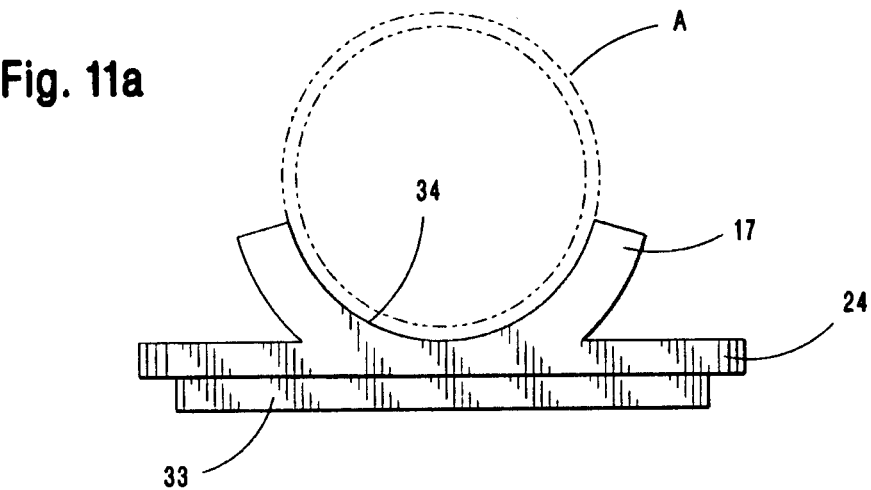
FIG. 11A is a front elevation view of a yoke.
Figure 11B:
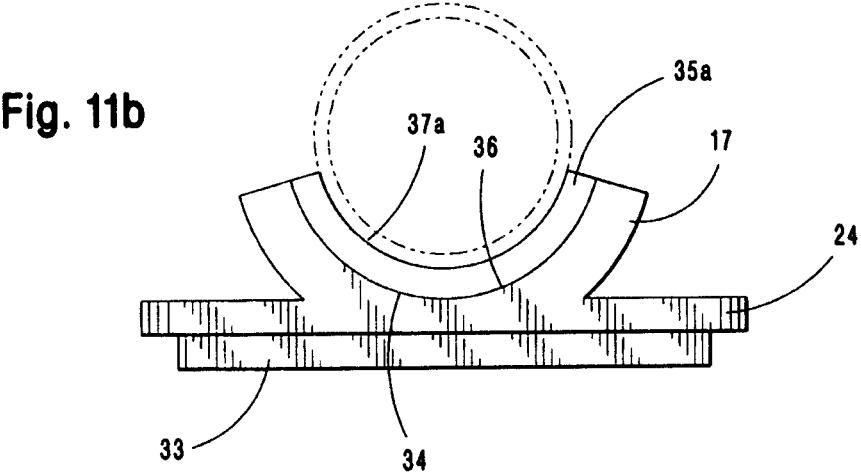
FIG. 11B is a front elevation view of a yoke and a cradle insert.
Figure 11C:
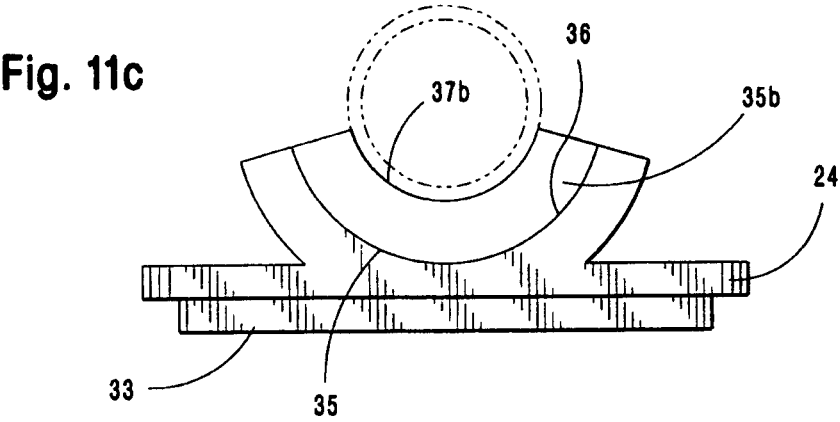
FIG. 11C is a front elevation view of a different yoke and a cradle insert.

Referring to FIGS. 11-11c, in certain instances, it may be desirable to have each pipe diameter in a range of pipe diameters "A-Z" (FIG. 6) contact the entire arc, or almost the entire arc, defining curved surface 34. In such instances, a selection of different size cradle liners 35 may be provided to match the diameter of each pipe in the range "A-Z." FIG. 11 shows a skid comprising a pedestal 15 demountably coupled to a yoke 16 and a cradle liner 35 placed within cradle 17 of the yoke. Cradle liner 35 comprises a curved surface 36 that matches the curved surface 34 of cradle 17 and a curved surface 37 that matches a particular pipe diameter in the range. As more clearly shown in FIG. 11a, curved surface 34 of cradle 17 in yoke 16 substantially matches the largest pipe diameter "A" in the range of pipe diameters "A-Z." However, the smaller pipe diameters in the range do not match the shape of the cradle 17 and accordingly, they are not held as securely within cradle and are less stable. FIGS. 11b and 11c show cradle inserts that are adapted to match a particular pipe diameter within range "A-Z." In FIG. 11b, curved surface 37a of cradle insert 35a matches an intermediate pipe diameter in the range "A-Z." In FIG. 11c, curved surface 37b of cradle insert 35b supports the smallest pipe diameter in the range "A-Z."

Figure 12:
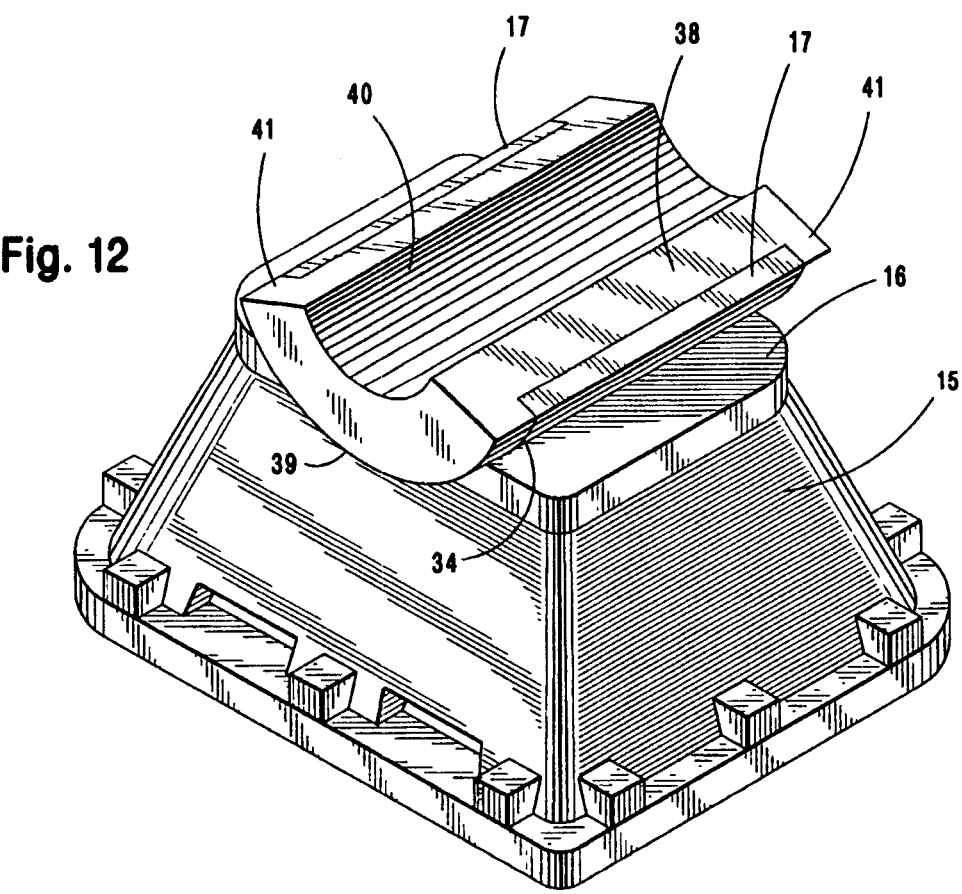
FIG. 12 is an isometric view showing an alternate cradle insert embodiment removably fixed in a yoke coupled to a pedestal.

Referring to FIG. 12, showing an alternate cradle insert embodiment 38, cradle insert 38 is removably fixed within to cradle 17 of yoke 16 demountably coupled to pedestal 15. Cradle insert 38 comprises an arc segment having a curved surface 39 that matches curved surface 34 of cradle 17 and a curved surface 40 that matches a particular pipe diameter in the range "A-Z." Similar to FIGS. 11b and 11c, cradle insert 38 may be adapted to match curved surface 40 to a particular pipe diameter falling within the range. Cradle insert 38 includes outward extending flanges 41 located at opposite ends of the cradle insert 38. When cradle insert 38 is removably fixed within cradle 17 flanges 41 overlap and engage the ends of cradle 17 to prevent lateral movement of the insert therein.

Figure 13:
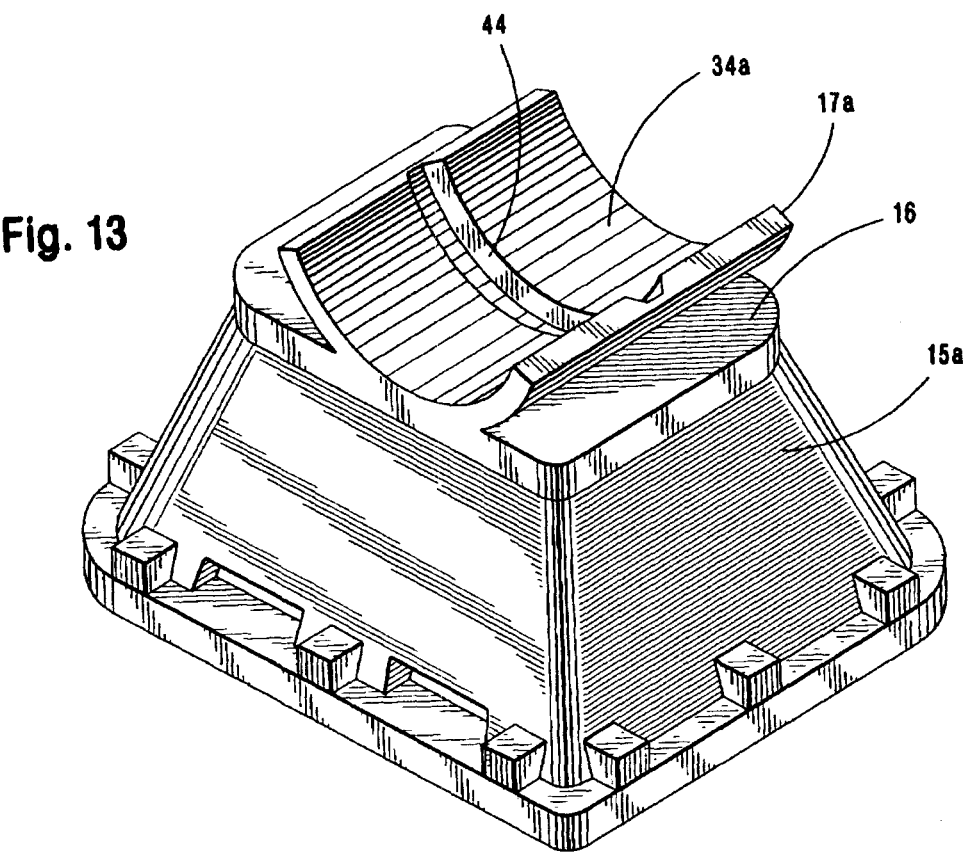
FIG. 13 is an isometric view showing a pedestal of the present skid invention demountably coupled to an alternate yoke embodiment.
Figure 14:
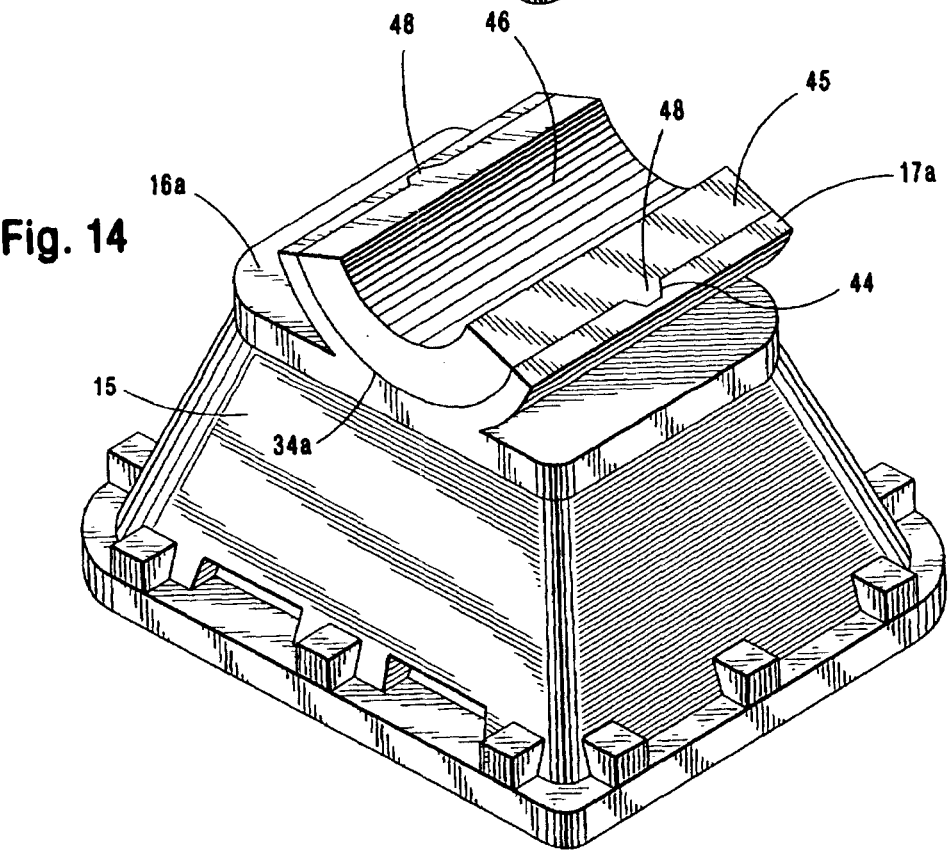
FIG. 14 is an isometric view showing an alternate cradle insert embodiment removably fixed within the yoke of FIG. 13.

Referring to FIGS. 13 and 14, an alternate yoke embodiment and alternate cradle insert embodiment are shown comprising a yoke 16a demountably coupled to pedestal 15a. Yoke 16a includes a groove 44 formed within the curved surface 34a of cradle 17a. A cradle insert 45, shown in FIG. 14, comprises an arc segment having a curved surface 46 that matches surface 34a of cradle 17a and a curved surface 47 that matches a particular pipe diameter. Similar to the cradle insert 38, cradle insert 45 may be adapted so that curved surface 47 matches any particular pipe diameter in the range of pipe diameters "A-Z." Cradle insert 45 includes tongue 48 that cooperates with groove 44 of cradle 17a to provide a tongue and groove connection that removably fixes cradle insert 45 within cradle 17a to prevent lateral movement of cradle insert 38 within the yoke 16a.

Of course, other means may be used to removably fix a cradle insert in a yoke cradle without departing from the scope of the prese4 nt invention. For example, such removably fixed cradle inserts may include threaded fasteners, removable pins or pegs, and other interlocking mechanisms not shown in the resent disclosure.

The present invention offers significant improvements in the field of pipeline construction. As such, the invention has been disclosed in terms of preferred embodiments thereof that fulfill each one of the objects of the present invention as set forth above and provides a new and improved skid for supporting pipe. Of course, various changes, modifications, and alterations from the teachings of the present invention may be contemplated by those skilled in the art without departing from the intended spirit and scope thereof.

I claim:

1. A skid, comprising:
   a) a tubular pedestal including a continuous wall having an outside surface and an inside surface defined by an opening that extends from a first open end through a second open end of said tubular pedestal; and
   b) a yoke comprising a downward extending coupling member inserted into said second open end of said tubular pedestal and removably captured therein, said yoke including a cradle shaped to support a pipe.

2. The skid recited in claim 1, comprising support blocks attached to said tubular pedestal proximate said first open end, each said support block having a top surface positioned to receive a stacked tubular pedestal placed over said continuous wall of tubular pedestal.

3. The skid recited in claim 2, wherein each said top surface of said support blocks is positioned at a height that places said stacked tubular pedestal at a raised position to prevent surface-to-surface contact between adjacent continuous walls of said stacked tubular pedestals.

4. The skid recited in claim 3, wherein said support blocks are attached to and spaced apart at locations along a base pad, said base pad extending in an outward direction along the periphery of said continuous wall proximate said first open end.

5. The skid recited in claim 1, wherein said tubular member is a frustum shape.

6. The skid recited in claim 5, wherein said tubular member is the frustum of a pyramid and said first open end is a rectangular ground plane end.

7. The skid recited in claim 6, wherein said second open end is a rectangular cutoff end and said opening extending from said ground plane end through said cutoff end is rectangular.

8. The skid recited in claim 1, wherein said yoke includes a platform located between said cradle and said a coupling member, said cradle extending in an upward direction from said platform, said coupling member extending in a downward direction from said platform, said coupling member shaped to correspond with a shape of the opening provided in said second open end.

9. The skid recited in claim 8, wherein said platform is shaped to correspond with a shape of said continuous wall along said second open end, said platform supported on said second open end of said continuous of said wall.

10. The skid recited in claim 1, wherein said yoke is a low friction material having a RCSF to steel between about 0.11 to about 0.20.

11. The skid recited in claim 10, wherein said yoke is a low friction material is a UHMWR polymer.

12. A skid system adapted to support at least two sets of different pipe diameter ranges, comprising:
   a) at least two tubular pedestals, each pedestal including a continuous wall with an outside surface and an inside surface defined by an opening that extends from a first open end through a second open end of said tubular pedestal, and; and
   b) a plurality of yokes, each yoke including a downward extending coupling member shaped to fit into said second open end of said tubular pedestal to removably capture said coupling member therein, said plurality of yokes further comprising;
      i) a first set of yokes, each yoke in said first set of yokes comprising a cradle shaped to correspond with a largest pipe diameter in a first range of different pipe diameters, and
      ii) a last set of yokes, each yoke in said last set of yokes comprising a cradle shaped to correspond with a largest pipe diameter in a last range of different pipe diameters.

13. The skid system recited in claim 12, wherein each pedestal includes support blocks attached to said tubular pedestal proximate said first open end, each said support block having a top surface positioned to receive a stacked tubular pedestal placed over said continuous wall of a first tubular pedestal.

14. The skid system recited in claim 13, wherein each said top surface of said support blocks is positioned at a height that places said stacked tubular pedestal at a raised position that prevents surface-to-surface contact between adjacent continuous walls of said stacked tubular pedestals.

15. The skid system recited in claim 12, comprising:
   a) a base pad extending in an outward direction along the periphery of said continuous wall proximate said first open end of said tubular pedestal, and
   b) support blocks attached to and spaced apart at locations along said base pad.

16. The skid system recited in claim 12, wherein said tubular pedestal is a frustum shape.

17. The skid system recited in claim 16, wherein said tubular pedestal is the frustum of a pyramid and said first open end is a rectangular ground plane end.

18. The skid system recited in claim 17, wherein said second open end is a rectangular cutoff end and said opening extending from said ground plane end through said cutoff end is rectangular.

19. The skid system recited in claim 12, wherein each yoke in said first yoke set, and each yoke in said last yoke set includes a platform located between said cradle and said coupling member, said cradle extending in an upward direction from said platform, said coupling member extending in a downward direction from said platform.

20. The skid system recited in claim 19, comprising:
   at least one intermediate set of yokes, each yoke in said intermediate yoke set includes a cradle shaped to correspond with a largest pipe diameter in an intermediate range of different pipe diameters.

21. The skid system recited in claim 19, wherein each said platform is shaped to correspond with a shape of said continuous wall along said second open end, said platform supported on said second open end continuous wall.

22. The invention recited in claim 12, comprising: a plurality of different size cradle inserts shaped to fit within said cradle, each said cradle insert having a support surface shaped to match a respective pipe diameter falling within said at least one range of different pipe diameters.

23. The invention recited in claim 22 including a means to removably fix each cradle insert within said cradle.

24. The skid system recited in claim 12, wherein said yokes are a low friction material having a RCSF to steel between about 0.11 to about 0.20.

25. The skid system recited in claim 24, wherein said yokes are a low friction material is a UHMWR polymer.

26. The invention recited in claim 22 wherein said cradle inserts are a low friction material having a RCSF to steel between about 0.11 to about 0.20.

27. The invention recited in claim 26 wherein said cradle inserts are a low friction material is a UHMWR polymer.

28. A skid system adapted to support a range of different diameter pipes, comprising:
   a) a plurality stackable pedestals, each pedestal including a continuous wall that encloses an opening extending from a first open end to through a second open end, each said stackable pedestal including at least two support blocks having a top surface positioned to support a stacked pedestal at a raised position when placed over a first pedestal, said raised position preventing a surface-to-surface contact between adjacent continuous walls of said stacked pedestals; and
   b) a plurality of yokes, each yoke including a downward extending coupling member shaped to fit into said second open end of said stackable pedestals to removably capturer said coupling member therein, each yoke comprising a cradle shaped to support a pipe.

29. The skid system recited in claim 28, wherein said support blocks are attached to and spaced apart at locations along a base pad, said base pad extending in an outward direction along the periphery of said continuous wall proximate said first open end.

30. The skid system recited in claim 28, wherein each said stackable pedestal is a frustum shape.

31. The skid system recited in claim 30, wherein said stackable pedestal is the frustum of a pyramid and said first open end is a rectangular ground plane end.

32. The skid system recited in claim 31, wherein said second open end is a rectangular cutoff end and said opening extending from said ground plane end through said cutoff end is rectangular.

33. The skid system recited in claim 28, wherein each yoke in said plurality of yokes includes a platform positioned between said cradle and a coupling member, said cradle extending in an upward direction from said platform and having a curved surface shaped to match a pipe diameter falling within a range of different pipe diameters.

34. The skid system recited in claim 33, wherein each said platform of each yoke is shaped to correspond with a shape of said continuous wall along said second open end, said platform supported on said second open end continuous wall.

35. The invention recited in claim 33, comprising: a plurality of different size cradle inserts shaped to fit within said cradle, each said cradle insert having a support surface shaped to match a respective pipe diameter in said range of different pipe diameters.

36. The invention recited in claim 35 including a means to removably fix said cradle inserts within said cradle.

37. The skid system recited in claim 28, wherein said yokes are a low friction material having a RGSF to steel between about 0.11 to about 0.20.

38. The skid system recited in claim 37, wherein said yokes are a low friction material is a UHMWR polymer.

39. The invention recited in claim 35, wherein said cradle inserts are a low friction material having a RCSF to steel between about 0.11 to about 0.20.

40. The invention recited in claim 39, wherein said cradle inserts are a low friction material is a UHMWR polymer.

41. A pipe skid, comprising:
   a) a tubular pedestal including a continuous wall with an outside surface and an inside surface defined by an opening that extends from a first open end through a second open end of said tubular pedestal;
   b) a base pad extending in an outward direction along the periphery of said continuous wall proximate said first open end;
   c) support blocks attached to and spaced apart at locations along said base pad; and
   d) a yoke releasably coupled to said pedestal, said yoke including a cradle shaped to support a pipe.

42. The pipe skid recited in claim 41, wherein each said support block has a top surface positioned to support a stacked tubular pedestal placed over a first tubular pedestal.

43. The pipe skid recited in claim 42, wherein said top surface supports said stacked pedestal at a raised position to prevent surface-to-surface contact between adjacent the continuous walls of said stacked pedestals.

44. The pipe skid recited in claim 41, wherein said yoke includes a coupling member inserted into said second open end to releasably couple said yoke to said pedestal.

* * * * *